United States Patent [19]
Thorngate et al.

[11] 3,835,331
[45] Sept. 10, 1974

[54] STABLE PULSED LIGHT SOURCE
[75] Inventors: John H. Thorngate; Phillip T. Perdue, both of Oak Ridge, Tenn.
[73] Assignee: The United States of America as represented by the Secretary of United States Atomic Energy Commission, Washington, D.C.
[22] Filed: Sept. 26, 1973
[21] Appl. No.: 401,091

[52] U.S. Cl. ............................. 250/552, 250/207
[51] Int. Cl. .......................................... H01j 39/12
[58] Field of Search ...... 250/207, 252, 552; 313/94, 313/95, 104; 307/310, 311, 318

[56] References Cited
UNITED STATES PATENTS
3,515,878  6/1970  Ried, Jr. et al. .................... 250/207
3,714,441  1/1973  Kreda ................................. 250/207
3,755,679  8/1973  Otsuka ............................... 250/552

*Primary Examiner*—James W. Lawrence
*Assistant Examiner*—Davis L. Willis
*Attorney, Agent, or Firm*—John A. Horan; David S. Zachry; L. M. Deckelmann

[57] ABSTRACT

A pulsed light source is provided for use as a standard source of light for the calibration of photomultiplier tubes and the like. The source utilizes an inexpensive light-emitting diode and produces pulses whose height and length may be adjusted. Temperature stabilization is employed and the diode is operated in the current mode. Typical resolution and stability are 3 and 0.5 percent, respectively.

4 Claims, 3 Drawing Figures

STABLE PULSED LIGHT SOURCE

BACKGROUND OF THE INVENTION

This invention was made in the course of, or under, a contract with the United States Atomic Energy Commission.

Experimenters using equipment in which photomultiplier tubes are utilized often require a standard source of light for calibration. A standard bulb operating at a constant current or a radioactive light source is sufficient for current measurements, but difficulties are encountered with pulse measurements. A typical example of such research is the measurement of pulses in conjunction with the work at the Oak Ridge National Laboratory in the purification of organic scintillators. A light pulser consisting of a small amount of $^{241}$Am in a NaI crystal of about 1 cm dimensions, manufactured by Harshaw Chemical Company, has been used to standardize these measurements. This unit provides a stable source of light pulses, but the size or length of the pulses cannot be varied; nor can the pulses be turned on and off in a reproducible manner. In addition, this light source has limited resolution.

Other workers have used light-emitting diodes (LED) as flexible sources of light pulses for standardization. Gallium phosphide diodes, for example, emit light within the spectral sensitivity of most photomultipliers used for nuclear pulse counting. This is important because resolution is limited by the number of photons available coupled with the quantum efficiency of the photocathode. The fast switching characteristics of these diodes also make them useful for measuring timing characteristics of phototubes or associated circuits. However, the pulsers described in the prior art offer limited stability and provide limited resolution. Furthermore, gallium phosphide diodes are expensive elements of the circuits.

When LED's are used as light sources, sufficient stability of the light output must be provided as the diode temperature changes. Temperature changes of the junction from variations in the ambient temperature and ohmic heating from the current through the diode result in changes in the potential drop across the diode for a given current. Since light output is essentially a function of current through the diode rather than the potential across the diode, voltage stabilization of the pulse source is not sufficient. Thus, there exists a need for an adjustable pulsed light source provided with means for temperature stabilization and which has improved resolution and which utilizes inexpensive components. The present invention was conceived to meet this need in a manner to be described hereinbelow.

SUMMARY OF THE INVENTION

It is the object of the present invention to provide an improved adjustable pulsed light source for the calibration of photomultiplier tubes and the like, wherein the source will have temperature stabilization and improved resolution while at the same time utilizing inexpensive components.

The above object has been accomplished in the present invention by utilizing an inexpensive, widely available gallium arsenide phosphide light-emitting diode. A 6,600 A emission of such a diode is near the limit of the spectral response region of a photomultiplier tube with an S-11 response, but is in a region where tubes with an S-20 response produce typical quantum efficiencies of 4 percent and bialkali tubes have efficiencies of about 0.2 percent. An increasing number of instruments now utilize photomultiplier tubes having S-20 or bialkali responses. Although small, this response is adequate for good resolution when coupled with the large number of photons that such diodes can produce. Temperature stabilization is provided within the circuit of the pulser of the present invention, and the LED is operated in a current mode rather than a voltage mode in order to obtain a high stability and resolution.

DESCRIPTION OF THE PREFERRED EMBODIMENT

Figure 1:
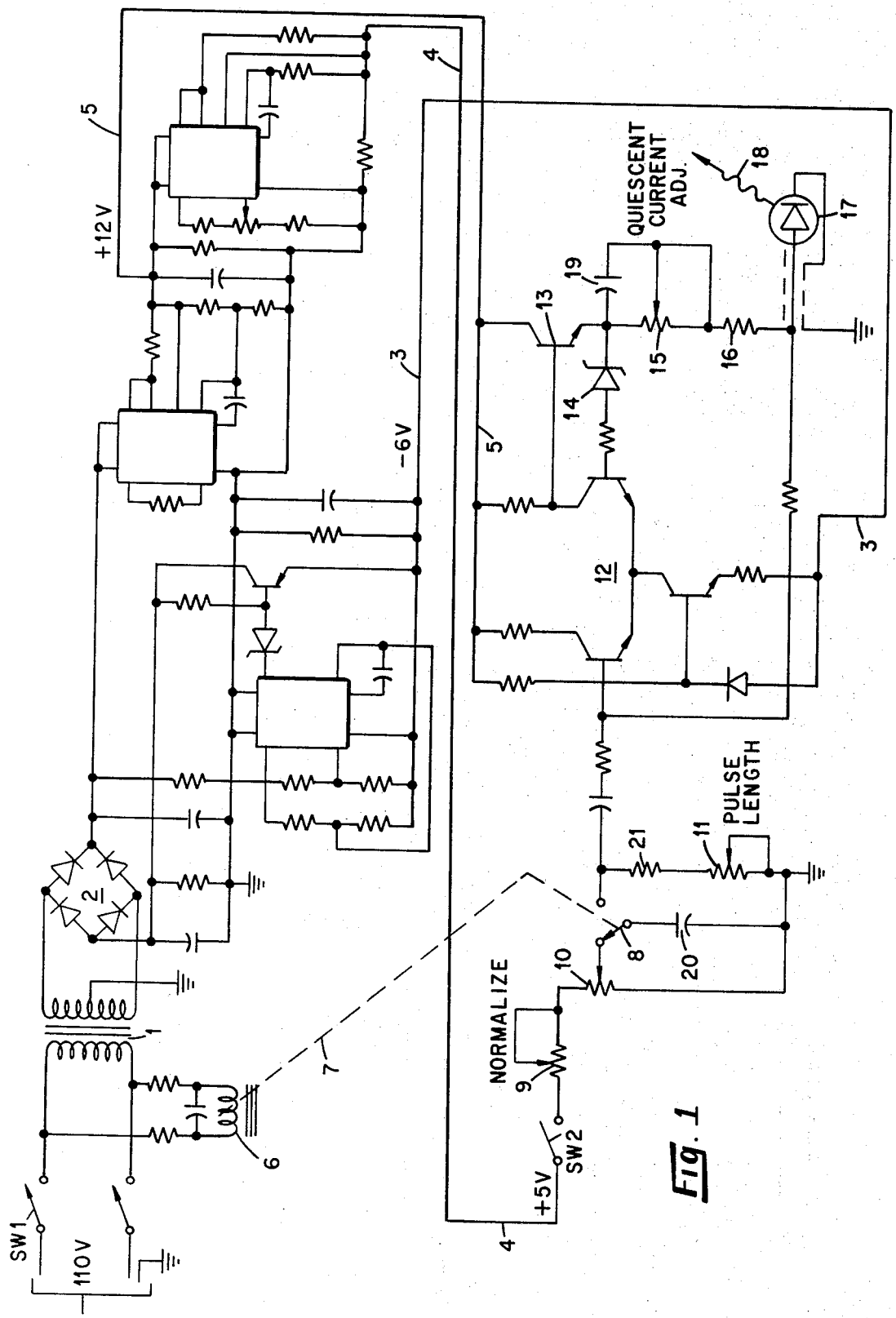
FIG. 1 is a schematic circuit diagram of a pulser utilized in the present invention to obtain the above object.

The circuit designed to provide the operating current for a gallium arsenide phosphide light-emitting diode is shown in FIG. 1. In the upper portion of this figure are illustrated conventional power supplies to supply the required voltages for the LED control circuit in the lower portion of this figure. A 110-volt A.C. power supply, not shown, is connected by means of a switch SW1 to the primary of a transformer 1 to provide 24 volts to a center tapped secondary thereof. The transformer 1 secondary is coupled to a full wave rectifier bridge 2 which in turn supplies the conventional power supplies, as shown, to provide, respectively, a +12 volt output on line 5, a +5 volt output on line 4, and a −6 volt output on line 3, and these outputs are coupled to the lower portion of FIG. 1 as shown.

A coil 6 of a pulse-forming relay is also coupled to the 110-volt power supply, and this relay is coupled by means of a mechanical coupling 7 to the arm 8 between a pair of relay contacts as shown in the lower portion of FIG. 1. Pulse forming and current control for the LED are achieved by the circuitry in the lower portion of FIG. 1. The well-known technique of using a mercury-wetted relay to alternately charge a capacitor 20 to a fixed voltage and then discharge it into a known resistance 21 is used as a source of pulses. A fast rise time and exponential decay fulfill the needs of the existing experiment, but other pulse sources with almost any shape could be used. For example, a pulse from a univibrator triggered by noise might be used as a source of random pulses. Variable rise times could be provided by integrating the input pulse with an R.C. circuit.

In the present invention, two ten-turn potentiometers are used to adjust pulse size: one potentiometer 9 is connected in series for normalization, and the second potentiometer 10 is connected as a voltage divider to set 0 to 100 percent pulse height by adjusting the charging voltage for the pulse capacitor 20. Pulse lengths are adjusted by using a ten-turn variable resistance 11 to discharge the pulse capacitor.

The output of the pulser network is coupled directly to a LED 17 and to a differential amplifier network 12. The transistors in the differential amplifier are part of an inexpensive integrated circuit that provides good temperature stability but limits the circuit bandwidth to about 100 MHz. The network 12 is coupled to an output transistor 13 which supplies a quiescent current to a LED 17 through a quiescent current adjustment potentiometer 15 and a resistor 16. A zener diode 14 that has a zero temperature coefficient is in series with a feedback signal from the transistor 13 to the network 12, and is used as the reference for the current source. Since the quiescent current of the LED 17 can be quite low, the resistance of the potentiometer 15 is made large (about 500 kohms), which is required for current sensing. It is bypassed for the pulses by a low inductance capacitor 19. The resistor 16 is a 90.9-ohm resistor, for example, and is used for current sensing for the pulses, and this resistor is a good match to both the LED 17 impedance and the impedance of the interconnecting coaxial cable. If the size of the input pulse is fixed, this resistor 16 sets the size of the current pulse through the diode.

The zero temperature coefficient zener diode 14 used as the reference for the current source on the differential amplifier was chosen for low current consumption, since true temperature compensation of this stage would require the use of an element whose temperature coefficient is equal and opposite to the transistor 13, such as a 1N748A. However, temperature instability in this circuit produces only second-order instabilities in the pulses due to the common mode rejection characteristics of the differential amplifier network 12. The unique aspect of the circuit shown is that it compares the current through the LED 17 with the input pulse and uses the same differential comparison circuit to control the quiescent current to the diode 17. Thus, by regulating the diode 17 current rather than the voltage, stability of 0.5 percent was achieved in the operation of the device of FIG. 1. The light output of the LED 17 is indicated by the reference numeral 18.

The effectiveness of the circuit of FIG. 1 in long-term stability is illustrated in the following table.

TABLE

| Diode No. | Average L/$\alpha$ | Average Q–L | Total Elapsed Time (min) |
|---|---|---|---|
| 0 | 0.492 ± 0.001 (0.25%) | | 7605 |
| 0 | 0.576 ± 0.001 (0.18%) | 90.3 ± 0.2 (0.24%) | 240 |
| 1 | 0.574 ± 0.002 (0.39%) | 75.4 ± 0.2 (0.27%) | 420 |
| 2 | 0.382 ± 0.004 (1.18%) | 62.1 ± 0.1 (0.20%) | 420 |
| 3 | 0.486 ± 0.001 (0.29%) | 65.9 ± 0.2 (0.30%) | 420 |
| 4 | 0.502 ± 0.003 (0.55%) | 65.5 ± 0.1 (0.21%) | 420 |
| 5 | 0.513 ± 0.001 (0.26%) | 66.8 ± 0.3 (0.45%) | 420 |
| 6 | 0.462 ± 0.001 (0.19%) | 67.1 ± 0.1 (0.15%) | 420 |
| 7 | 0.523 ± 0.001 (0.20%) | 72.3 ± 0.1 (0.17%) | 420 |

Data for the above table were recorded as pulse height distributions on a multichannel analyzer simultaneously with those from the $\alpha$-light source mentioned hereinabove. The ratios (L/$\alpha$) of the LED peak to the $\alpha$-light source peak were then calculated. The uncertainties quoted are one standard deviation of the average of all of the data for each run, and are expressed as a percent deviation by the figure in parentheses. When the uncertainties involved in the calculation of the peak centroids are taken into account, the average values have an uncertainty about twice as large as that calculated from the average alone. Also shown in the table is the short-term (7 hr.) stability of seven LED's that were run to show that the choice of diode is not critical unless absolute maximum stability is desired. The low cost of the diodes, however, permits the purchase of several for selection purposes when this maximum stability is desired.

Two runs were made with diode number 0 at different pulse lengths. The first used the minimum pulse length, and the second used a pulse length midway between that produced by a standard charge pulser and that from the $\alpha$-light pulser. Moreover, the first run included the initial warm-up period of the electronics. For all of the other runs, the electronics were allowed to stabilize overnight before the collection of data began.

The stability of the pulse length (Q–L) was measured for the last seven diodes and is also given in the above table. These data were recorded from a time-to-pulse height converter that is part of a conventional pulse shape discrimination circuit. Because the absolute zero on this scale was not known, the difference of the centroid of the peak produced by the light pulser and that produced by a charge pulser connected to the preamplifier was used rather than the ratio.

Figure 2:
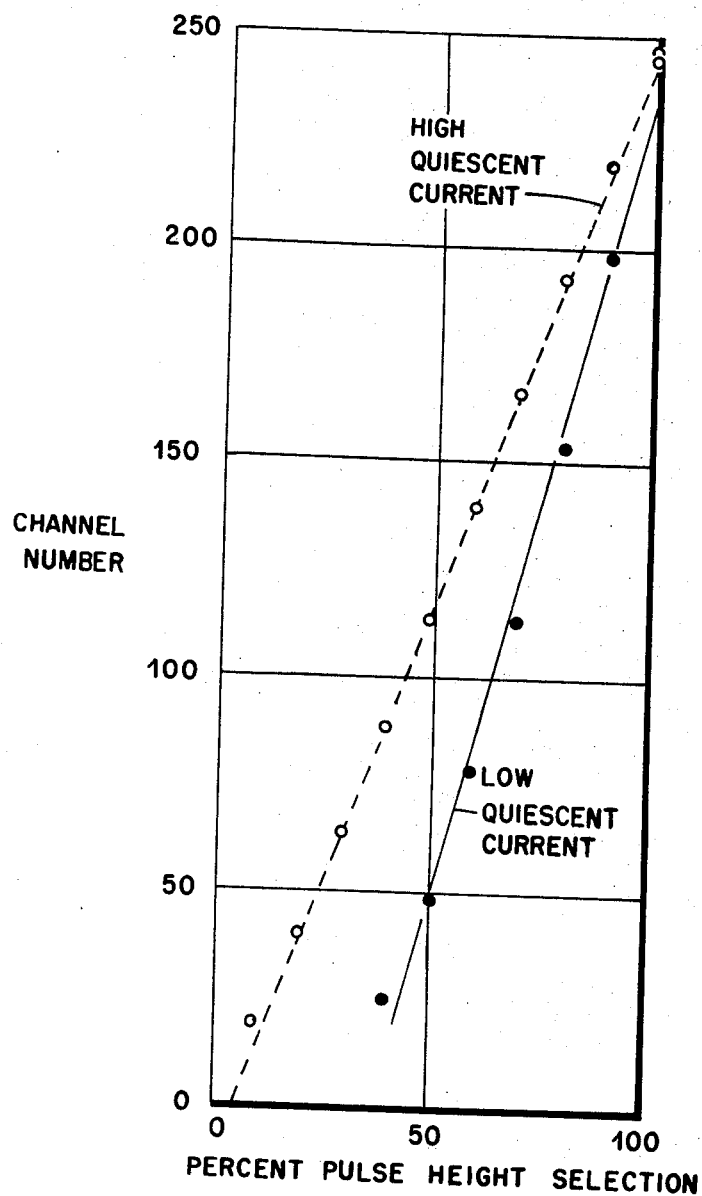
FIG. 2 is a plot illustrating linearity and zero intercept of the light source of the present invention as a function of quiescent current.

The effect of varying the pulse height is shown in FIG. 2, where straight lines that best fit the data have been drawn for reference. The difference between the two curves was the setting of the quiescent current. For one, a low (15 $\mu$A) quiescent current was used and the resulting limited linearity and nonzero intercept are easily seen. Both result from the approximation that light output is a linear function of current, which is true only over a limited current range and fails at both low and high currents. A large quiescent current (~1 mA) was used to obtain the other curve. Better linearity and a closer zero intercept result, but at such a high current the diode is continuously emitting light, resulting in an increase in noise from the PM tube. By superimposing the variable pulses on a fixed (d.c.) pedestal, e.g., 12 volts, this noise at high quiescent current could be substantially avoided and linearity and zero intercept maintained.

Figure 3:
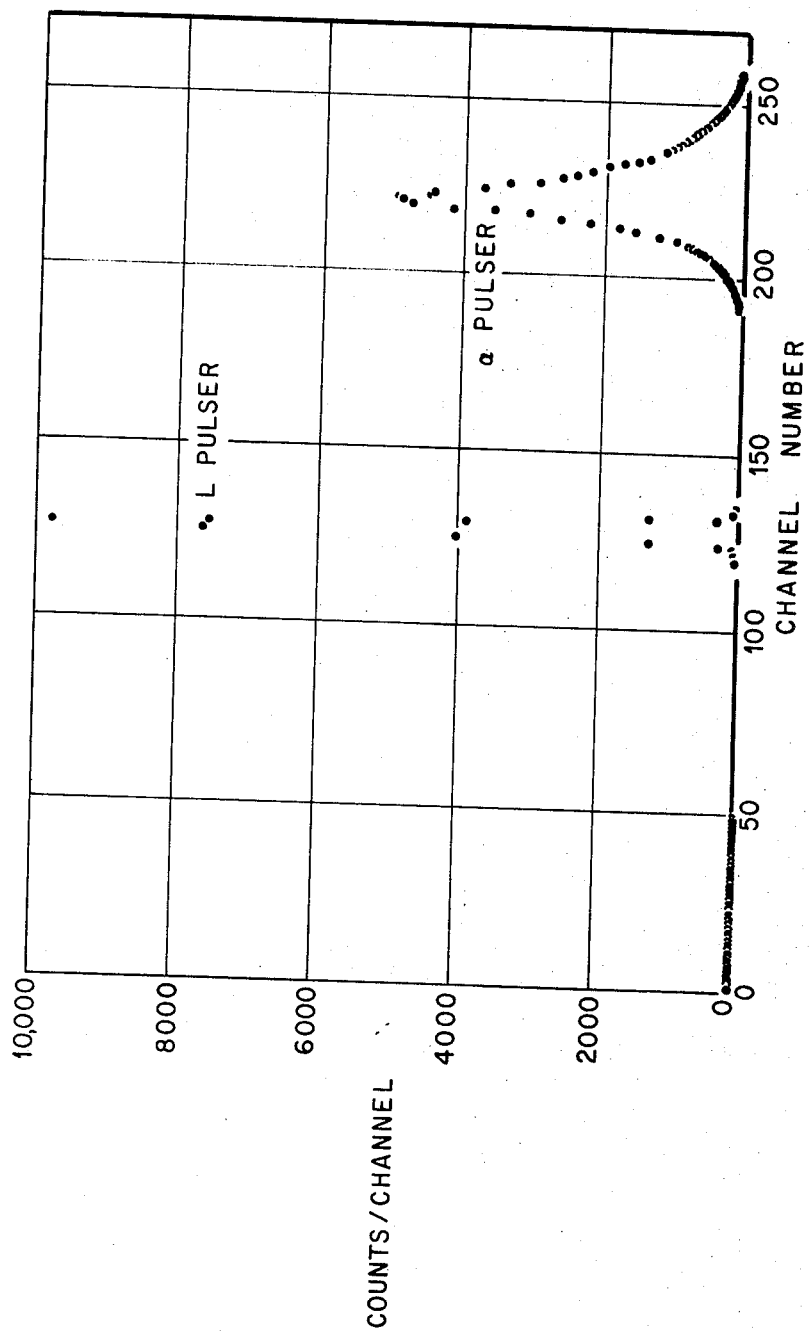
FIG. 3 is a plot comparing the pulse distributions produced by the light source of the present invention and a prior art $\alpha$-source light pulser.

FIG. 3 compares the resolution of the $\alpha$-light source and the LED. Resolution typical of that obtained during stability runs is indicated in this figure. A resolution of 1.3 percent was obtained for the 100 percent PHS data when the 1 mA quiescent current was used in the system of FIG. 1. For all tests of the present invention, an average typical resolution of 3 percent was achieved.

The present invention, as described above, provides a pulsed monochromatic light source for many applications. It may be used to calibrate photomultiplier tubes used in many detection systems and as a standard in-line calibration for systems used to evaluate scintillating materials. It could also be of value in calibrating optical multichannel analyzers.

This invention has been described by way of illustration rather than by limitation and it should be apparent that it is equally applicable in fields other than those described.

What is claimed is:

1. A stable pulsed light source comprising a source of pulses, means for adjusting the pulse height and the pulse length of said pulses, a light-emitting diode, means for connecting the output of said source of pulses directly to said diode, and a comparison circuit connected between said source of pulses and said diode, said comparison circuit including a differential amplifier network connected to said source of pulses, an output transistor connected to said network, a feedback circuit provided with a temperature compensated zener diode connected between said output transistor and said differential amplifier network, and means for providing an adjustable quiescent current to said light-emitting diode connected between a junction of said transistor and zener diode and to said light-emitting diode, said comparison circuit being utilized to compare the current through said light-emitting diode with the input pulses and to control the amount of quiescent current to said light-emitting diode, whereby said light-emitting diode provides a relatively stable pulsed light source with good resolution for calibration purposes.

2. The light source set forth in claim 1, wherein said light-emitting diode is a gallium arsenide phosphide diode.

3. The light source set forth in claim 2, wherein said means for providing an adjustable quiescent current to said light-emitting diode comprises a relatively high resistance potentiometer and a resistor connected in series between said junction and said light-emitting diode, and a low inductance capacitor connected across said high resistance potentiometer.

4. The light source set forth in claim 3, wherein said high resistance potentiometer has a resistance of 500 Kohms and said resistor has a resistance of 90.9 ohms.

* * * * *